United States Patent
Cappeller et al.

(10) Patent No.: US 9,593,734 B2
(45) Date of Patent: Mar. 14, 2017

(54) GAS-OPERATED SPRING

(71) Applicant: SPECIAL SPRINGS S.R.L., Romano D'Ezzelino (IT)

(72) Inventors: Augusto Cappeller, Bassano Del Grappa (IT); Alessandro Cappeller, Tezze Sul Brenta (IT); Dante Cappeller, Cartigliano (IT)

(73) Assignee: SPECIAL SPRINGS S.R.L., Romano D'Ezzelino (IT)

( * ) Notice: Subject to any disclaimer, the term of this patent is extended or adjusted under 35 U.S.C. 154(b) by 0 days.

(21) Appl. No.: 14/814,942

(22) Filed: Jul. 31, 2015

(65) Prior Publication Data
US 2016/0032999 A1    Feb. 4, 2016

(30) Foreign Application Priority Data

Jul. 31, 2014  (IT) .............................. PD2014A0205

(51) Int. Cl.
*F16F 9/18*    (2006.01)
*F16F 9/02*    (2006.01)

(52) U.S. Cl.
CPC .... *F16F 9/0218* (2013.01); *F16F 2230/0047* (2013.01)

(58) Field of Classification Search
CPC .. F16F 9/0218; F16F 9/36; F16F 9/365; F16F 9/0209; F16F 2230/24; F16F 9/0281
USPC ........................................................ 267/129
See application file for complete search history.

(56) References Cited

U.S. PATENT DOCUMENTS

| 5,088,698 | A  | * | 2/1992 | Wallis | B21D 24/02 267/119 |
| 6,796,159 | B2 | * | 9/2004 | Kelm | B21D 24/02 72/351 |
| 6,971,303 | B2 | * | 12/2005 | Johansson | F16F 7/12 188/322.18 |
| 2011/0303084 | A1 | * | 12/2011 | Cappeller | F15B 15/1428 92/169.1 |
| 2013/0228069 | A1 | * | 9/2013 | Cappeller | F16J 10/00 92/169.1 |

FOREIGN PATENT DOCUMENTS

| EP | 2406520 |     | 1/2012 |     |
| EP | 2634451 | A1  | 9/2013 |     |
| EP | 2644294 | A1  | 10/2013 |     |
| EP | 2778465 | A1 * | 9/2014 | ............... F16F 9/02 |
| WO | WO 2010/102994 | A1 | 9/2010 |     |

* cited by examiner

*Primary Examiner* — Robert A Siconolfi
*Assistant Examiner* — Mahbubur Rashid
(74) *Attorney, Agent, or Firm* — Scully, Scott, Murphy & Presser, P.C.

(57) ABSTRACT

A gas-operated spring with overtravel safety device, comprising:
  a tubular containment jacket,
  an end face,
  an opposite annular portion for closing the tubular jacket and for the passage of a piston rod,
  a piston rod arranged so as to pass through the annular portion,
a chamber for pressurized gas being defined between the tubular jacket, the end face, the annular portion and the piston rod, the gas-operated spring comprising elements for clearly indicating that overtravel for the piston rod has occurred.

2 Claims, 2 Drawing Sheets

GAS-OPERATED SPRING

The present invention relates to a gas-operated spring.

Gas-operated springs are usually defined by a tubular gas containment jacket, which is closed hermetically at one end by an end face provided with a valve for charging with gas, and at the other end by a head portion, which is perforated for the passage of a rod of a piston, which translates inside the jacket; the jacket, the end face and the head portion define the travel space for the piston, while said piston, with the jacket and the end face, defines the gas compression and expansion chamber.

Such gas-operated springs are typically, but not exclusively, also used in situations, such as in the use of mold dies, mold presses, and the like, in which they can be subjected to situations of high internal pressure or of impact with the associated parts of a press or of a mold die, such that they are susceptible of being damaged; such damage can render the gas-operated spring unusable, making replacement necessary and entailing the shutdown of the machine or plant in which it is deployed to operate, but such damage can also be such as to cause harm to an operator who happens to be in the vicinity, such as in the event of an explosion owing to an uncontrolled increase in the pressure, or in the event of an explosion owing to damage of the piston-rod or of the parts that retain it inside the jacket, or in the event of breakage with uncontrolled outflow of pressurized gas.

One of the foremost reasons that lead to such damage is what is known as 'overtravel' of the piston, i.e. a retracting stroke of the piston rod which is greater than the permitted stroke which that specific gas-operated spring is built to handle.

Such 'overtravel' can be caused for example by an unexpected increase of travel on the rod of the spring, which forces the rod to re-enter the body of the spring for an unestimated length, thus generating an 'overtravel' which cannot be supported by the overall structure of the spring.

The spring can thus 'belly' or split open, or it can break at the points where the parts that go to make it up are joined together, or the sealing elements can give way; in all these cases the result can be an unexpected, unwanted, and dangerous rapid outflow of gas.

In order to prevent such dangerous overtravel situations from happening, gas-operated springs have been devised which comprise safety devices adapted for the controlled outflow, in safety, of the pressurized gas in the event of overtravel.

Such a gas-operated spring is disclosed and claimed, for example, in EPA 2406520 by SPECIAL SPRINGS S.R.L., with a priority date of Mar. 10, 2009.

Such gas-operated spring with overtravel safety device comprises a tubular gas containment jacket, which is hermetically closed at one end by an end face and at the other end by a head portion, which is perforated for the passage of a rod of a piston; the jacket, the end face and the piston define the gas compression and expansion chamber; the gas-operated spring is characterized in that it has, on the inner face of the jacket, in the compression chamber, at least one region in low relief which is designed to break the seal provided by the sealing means which are associated either with the piston or with the head portion, and which operate against the inner face of the jacket; such low relief region is provided in a position that is such as to define the limit of travel of the retracting stroke of said piston or of said head portion.

Such gas-operated spring with overtravel device, though working very well and being widely appreciated on the market, has an aspect that can be improved, linked to the visibility of the fact that the overtravel device has come into play.

In fact, if an overtravel situation has occurred, the spring may appear to be in perfectly good condition, but part of the gas has escaped in a controlled manner and as a consequence the operation of the spring is no longer what is expected of it.

The outflow of gas from the spring, owing to the intervention of the safety device against the overtravel of the piston rod, cannot be perceived and the poor operation of a partially discharged gas-operated spring will be evident only when a product that is output from a die or from a press in which such a gas-operated spring is deployed fails to meet the design specifications.

The aim of the present invention is to provide a gas-operated spring which is capable of overcoming the above mentioned limitation of conventional gas-operated springs.

Within this aim, an object of the invention is to provide a gas-operated spring in which it can be clearly perceived that the overtravel safety device has come into play.

Another object of the invention is to provide a gas-operated spring which enables a user to rapidly restore a die or other machine in which the gas-operated spring is deployed to full efficiency.

Another object of the invention is to provide a gas-operated spring the functionality of which is not lower than conventional gas-operated springs.

This aim and these and other objects which will become better evident hereinafter are achieved by a gas-operated spring that comprises:

a tubular containment jacket, an end face, an opposite annular portion for closing said tubular jacket and for the passage of a piston rod, a piston rod arranged so as to pass through said annular portion, a chamber for pressurized gas being defined between said tubular jacket, said end face, said annular passage portion for a piston rod, and said piston rod, characterized in that it comprises means for clearly indicating that overtravel for said piston rod has occurred.

Further characteristics and advantages of the invention will become better apparent from the detailed description that follows of a preferred, but not exclusive, embodiment of the gas-operated spring according to the invention, which is illustrated for the purposes of non-limiting example in the accompanying drawings wherein.

Figure 1:
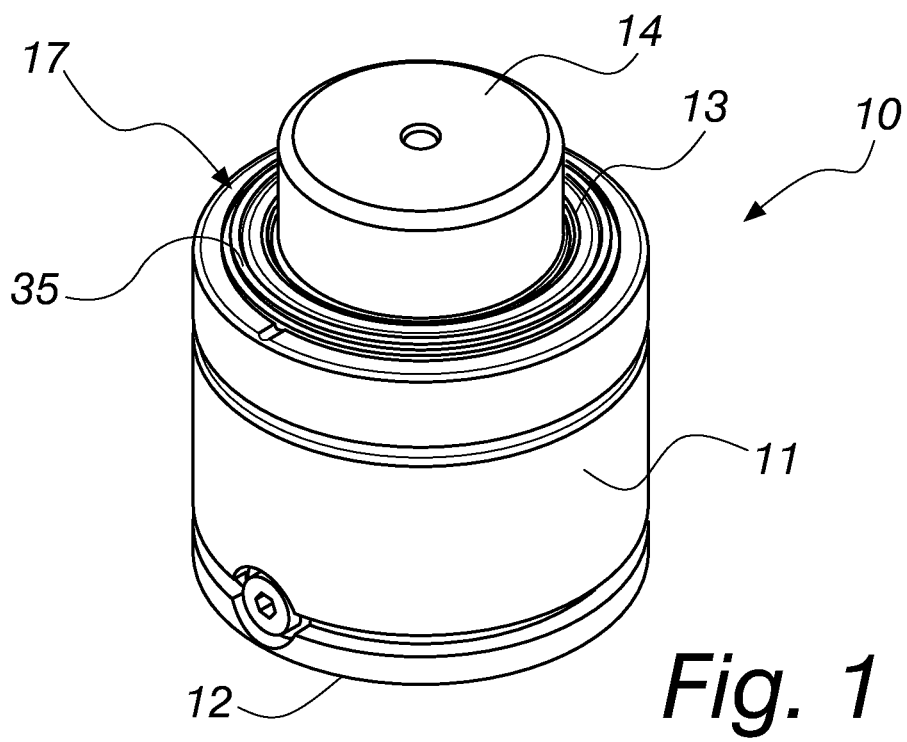
FIG. 1 is a perspective view of a gas-operated spring according to the invention.

With reference to the figures, a gas-operated spring according to the invention is generally designated with the reference numeral 10.

Such gas-operated spring 10 is of the type comprising:

a tubular containment jacket 11, an end face 12, an opposite annular portion 13 for closing the tubular jacket 11 and for the passage of a piston rod 14, a piston rod 14 arranged so as to pass through the annular portion 13.

A chamber 15 for pressurized gas is defined between the tubular jacket 11, the end face 12, the annular passage portion 13 for a piston rod 14, and the piston rod 14.

In the present embodiment of the invention, which should be understood to be non-limiting, the gas-operated spring 10 also comprises an overtravel safety device 16.

The peculiarity of the invention lies in that it comprises means 17 for clearly indicating that overtravel for the piston rod 14 has occurred.

In particular, in the present embodiment described herein by way of non-limiting example of the invention, the overtravel safety device 16 comprises:

an annular safety body 18, which defines the opposite passage portion for the piston rod 14, arranged in the jacket 11 so as to protrude from it by an overtravel safety extent 19 and coupled to the jacket 11 with extraction-preventing means, for example a metallic ring 20 adapted to abut against a first shoulder 21 defined on the inner surface 22 of the jacket 11 and a second, opposite shoulder 23 defined on the annular safety body 18; such annular safety body 18 having at least one sealing ring 24 pressed against the inner surface 22 of the tubular jacket 11;

at least one region in low relief 25, designed to break the seal of the sealing ring 24 when the sealing ring 24 is arranged thereat; the low relief region 25 is provided in such a position as to define the limit of the retracting stroke of the annular safety body 18.

The region in low relief 25 is provided, for example, by an annular recess.

The means 17 for clearly indicating that overtravel has occurred are constituted, in the embodiment described herein by way of non-limiting example of the invention, by a plastically deformable ring 35 which is fixed between the annular safety body 18 and the inner rim 27 of the mouth 28 of the tubular jacket 11 into which the annular safety body 18 is inserted.

The plastically deformable ring 35 is usually arranged with one of its portions outside the tubular jacket 11.

Figure 3:
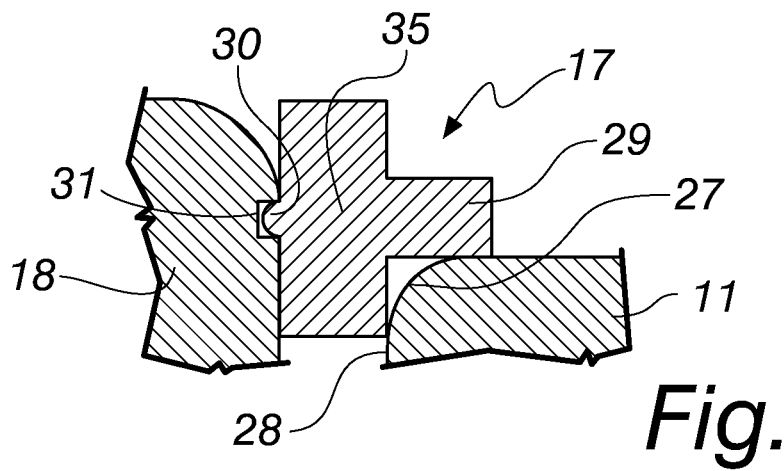
FIG. 3 is a detail of FIG. 1, in a normal configuration of use.

In the present embodiment, the plastically deformable ring 35, a cross-section of which is clearly visible in FIG. 3, comprises an external perimetric flap 29 for resting on the rim 27, and an internal annular rib 30 for interlocking in a corresponding annular seat 31 which is defined on the outer surface of the annular safety body 18.

In a variation of embodiment, not shown for the sake of simplicity and understood to be equivalent to what is described above, the fixing of the plastically deformable ring 35 is provided by way of fastening a raised portion protruding from the annular body 18 inside a complementarily shaped seat defined on the plastically deformable ring 35.

In a further variation of embodiment, also not shown, the fixing of the plastically deformable ring 35 is achieved by interference of such plastically deformable ring 35 with the annular body 18, or between the annular body 18 and the rim 27 of the tubular jacket 11.

The plastically deformable ring 35 is made of plastic material, or of another plastically deformable or breakable material.

Operation of the gas-operated spring 10 according to the invention is the following.

Figure 2:
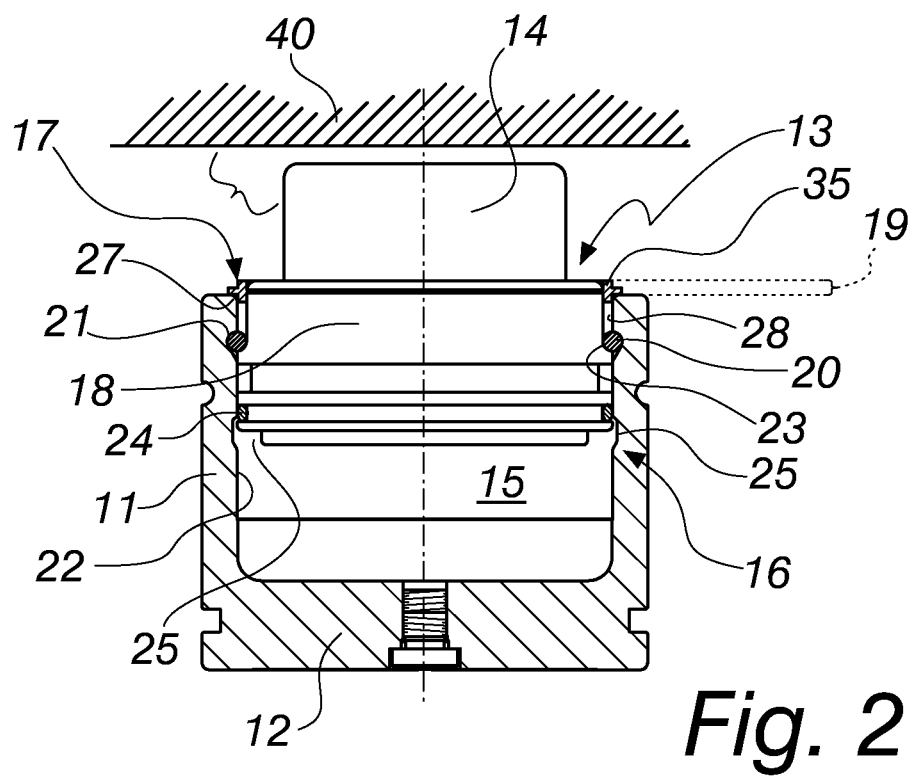
FIG. 2 is a sectional side view of the gas-operated spring in FIG. 1.

In the event of overtravel, a post 40, for example of a press, shown schematically in FIG. 2, descends until it comes into contact with the annular safety body 18, propelling it, together with the piston rod 14, inside the tubular jacket 11 from which it protrudes by the extent 19.

The translation of the annular safety body 18 inward of the jacket 11 produces the movement of the sealing ring 24 so as to affect the low relief region 25, with consequent separation of the sealing ring 24 from the inner surface 22 of the tubular jacket 11 and consequent creation of outward escape routes for the gas from the chamber 15.

At the same time, the movement inward of the annular safety body 18 produces the entrainment of the plastically deformable ring 35, which is fastened to it by way of the coupling between the rib 30 and the corresponding seat 31, and the plastically deformable ring 35 is also compressed by the post 40 of the press or die.

Figure 4:
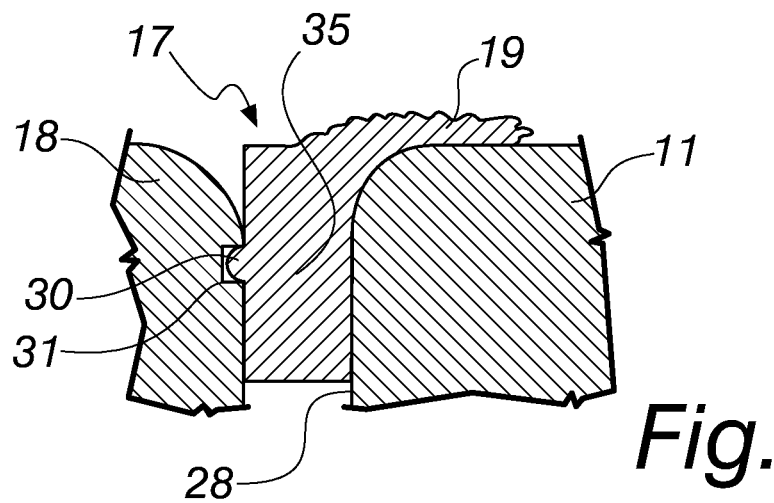
FIG. 4 is the detail in FIG. 3 in a first deformed configuration.

During the compression and the entrainment of the plastically deformable ring 35 the external perimetric flap 29 deforms plastically, as in FIG. 4, clearly indicating that overtravel of the piston rod 14 has occurred.

Figure 5:
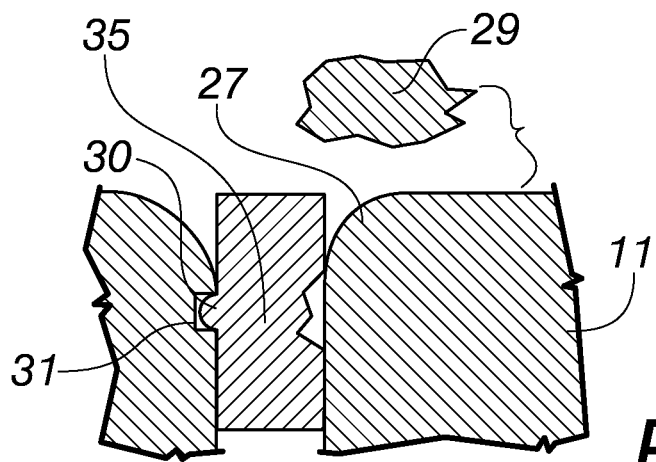
FIG. 5 is the detail in FIGS. 3 and 4 after breakage has occurred.

As shown for the purposes of example in FIG. 5, the external perimetric flap 29 can be broken.

Thanks to the presence of the indicator means 17, even if the annular safety body 18 and the piston rod 14 return to the normal working position under the thrust of the residual gas inside the chamber 15, the deformation or the breakage of the plastically deformable ring 35 in any case makes it immediately evident to the naked eye that the situation of overtravel has occurred, which the user can immediately take steps to remedy.

Obviously it should be understood that another object of the invention is a gas-operated spring with no overtravel safety device and provided with means of clearly indicating that overtravel of the piston rod has occurred.

In practice it has been found that the invention fully achieves the intended aim and objects.

In particular, with the invention a gas-operated spring has been devised in which, thanks to the means 17 of clearly indicating that overtravel has occurred, it can clearly be seen that the overtravel safety device has been engaged.

Such gas-operated spring 10 makes it possible for a user to rapidly restore to full efficiency a die or other press machine in which the gas-operated spring is deployed, by replacing the gas-operated spring.

With the invention a gas-operated spring has been devised the functionality of which is not lower than conventional gas-operated springs.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. PD2014A000205 from which this application claims priority are incorporated herein by reference.

What is claimed is:

1. A gas-operated spring with overtravel safety device, comprising:
   a tubular containment jacket,
   an end face,
   an opposite annular passage portion for closing said tubular containment jacket and for a passage of a piston rod,
   a piston rod arranged so as to pass through said opposite annular portion, a chamber for pressurized gas being defined between said tubular containment jacket, said end face, said opposite annular passage portion, and said piston rod, further comprising means for clearly indicating that overtravel for said piston rod has occurred, and further comprising an overtravel safety device that comprises:

an annular safety body, which defines said opposite annular passage portion for said piston rod, arranged in said tubular containment jacket so as to protrude from said annular safety body by an overtravel safety extent and coupled to said tubular containment jacket with extraction-preventing means, having at least one sealing ring pressed against an inner surface of said tubular containment jacket, at least one region in low relief, designed to break the seal of said at least one sealing ring when said at least one sealing ring is arranged at said at least one region in low relief, said low relief region being provided in such a position as to define a limit of a retracting stroke of said annular safety body, wherein said means for clearly indicating that overtravel has occurred are constituted by a plastically deformable ring which is fixed between said annular safety body and an inner rim of a mouth of said tubular containment jacket in which said annular safety body is inserted, said plastically deformable ring being normally arranged so that at least one portion thereof is external to said tubular containment jacket.

2. The gas-operated spring according to claim 1, wherein said plastically deformable ring comprises an external perimetric flap for resting on said inner rim and an internal annular rib for interlocking in a corresponding annular seat which is defined on an outer surface of said annular safety body.

* * * * *